J. VENO.
HANDLE EXTRACTOR FOR AXES, HAMMERS, &c.
APPLICATION FILED JAN. 6, 1910.
975,304.
Patented Nov. 8, 1910.
2 SHEETS—SHEET 1.
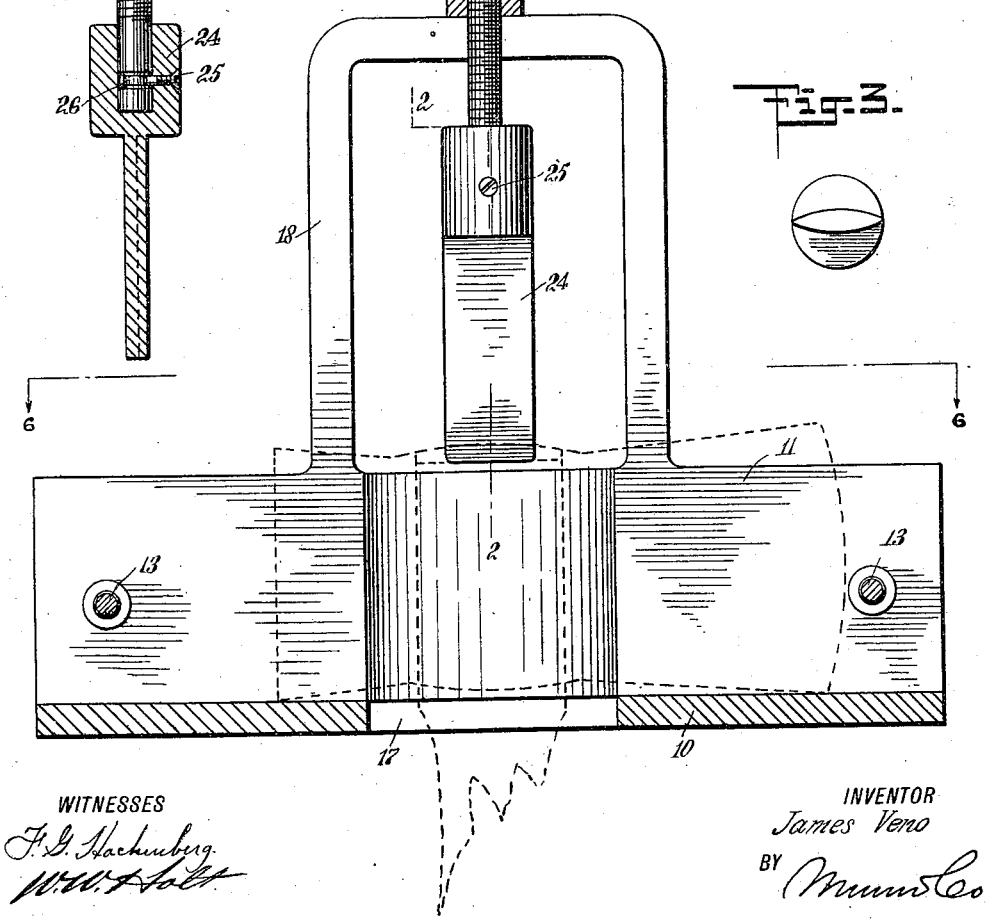
WITNESSES
INVENTOR
James Veno
BY
ATTORNEYS J. VENO.
HANDLE EXTRACTOR FOR AXES, HAMMERS, &c.
APPLICATION FILED JAN. 6, 1910.
975,304.
Patented Nov. 8, 1910.
2 SHEETS—SHEET 2.
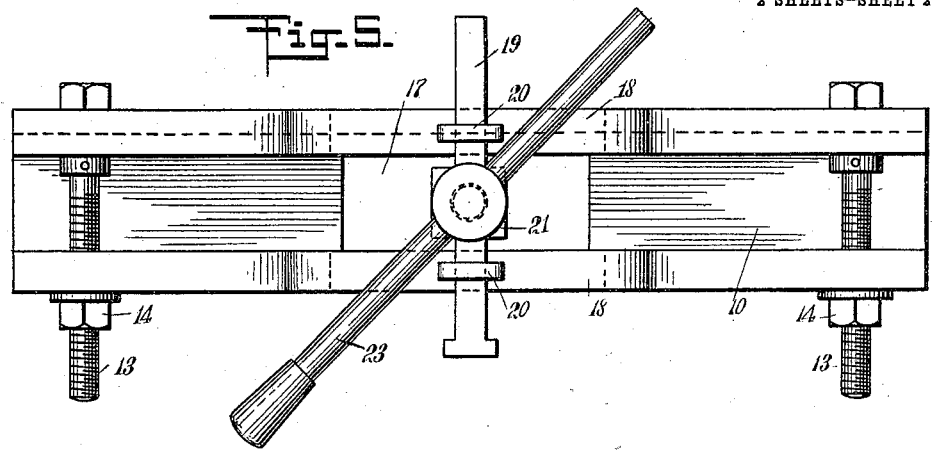
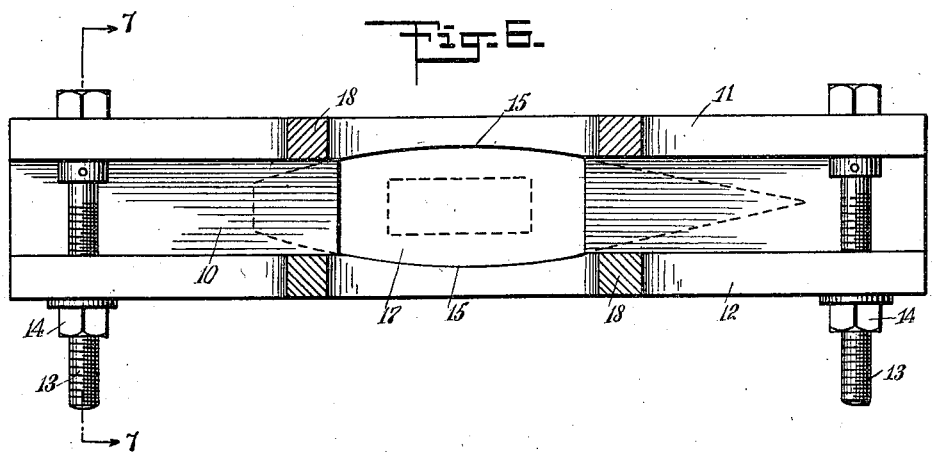
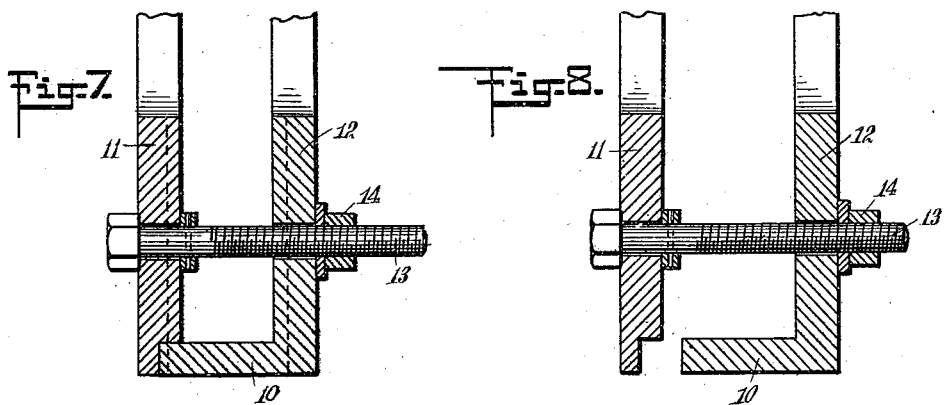
WITNESSES
INVENTOR
James Veno
BY
Munn & Co
ATTORNEYS

UNITED STATES PATENT OFFICE.

JAMES VENO, OF VANCOUVER, BRITISH COLUMBIA, CANADA.

HANDLE-EXTRACTOR FOR AXES, HAMMERS, &c.

975,304.

Specification of Letters Patent.

Patented Nov. 8, 1910.

Application filed January 6, 1910. Serial No. 536,599.

*To all whom it may concern:*

Be it known that I, JAMES VENO, a subject of the King of Great Britain, and a resident of Vancouver, in the Province of British Columbia and Dominion of Canada, have invented a new and Improved Handle-Extractor for Axes, Hammers, &c., of which the following is a full, clear, and exact description.

The invention has in view a device for positively extracting handles from various tools, such as axes, hammers, picks, etc., the device embodying a clamp for securing the head of the tool, and a punch, preferably screw-actuated and supported from the clamp in a position to press on the handle, the punch being swiveled on the screw so that the screw will turn independently thereof, and removably applied to permit of a variety of punches of different sizes and shapes being used.

Reference is to be had to the accompanying drawings forming a part of this specification, in which similar characters of reference indicate corresponding parts in all the views.

Figure 1 is a central vertical section of a handle extractor constructed in accordance with my invention, with a broken handle being shown in position for the handle to be removed; Fig. 2 is a vertical section of the punch on the line 2—2 of Fig. 1; Fig. 3 is an inverted plan of the punch; Fig. 4 is a sectional view, showing the connection between the cross-bar and one of the supporting yokes; Fig. 5 is a plan of the extractor complete; Fig. 6 is a horizontal section of the same on the line 6—6 of Fig. 1; Fig. 7 is a cross-section of the extractor on the line 7—7 of Fig. 6; and Fig. 8 is a sectional view similar to Fig. 7, showing the sides or jaws of the trough clamp retracted.

In the construction of my improved handle extractor I preferably employ a trough clamp 10, one side 11 of which, as best shown in Figs. 7 and 8, is relatively movable to and from the opposite side 12 and operatively connected thereto near each end of the clamp by clamping-screws 13, the clamping screws being journaled in and held against longitudinal movement at one side and provided with nuts 14 at the opposite side. The sides 11 and 12 of the clamp are each fashioned at the center to form clamping-jaws, as best shown in Fig. 6, for which purpose the inner faces thereof are formed concave, as indicated at 15, to, in a measure, conform to the side faces of the conventional ax, hammer, pick, etc. Between the jaws the bottom of the clamp is provided with an opening 17 through which the handle of the tool is adapted to extend and be forced. Each side of the clamp at the jaws 15 has an upwardly-extending yoke 18 rigid therewith, on the upper portion of which is carried a cross-bar 19, the cross bar being slidably retained in the yoke by keepers 20, one of which is secured to each yoke support, as shown in Fig. 4. The center of the cross-bar is expanded and threaded to provide a nut 21, in which screws an operating screw 22 having an actuating handle 23 at its upper end, and at its lower end carrying a punch 24, the punch being journaled or swiveled on the screw, on which it is removably retained by a screw 25 threaded into the head of the punch and entering a circumferential groove 26 formed in the screw 22. The point of the punch is of the same general form as but slightly smaller than the eye of the tool which receives the handle. Each extractor is ordinarily provided with several punches of varying forms and sizes so as to adapt the extractor to a variety of differently shaped and different sized handles.

In the operation of the device, the tool from which the broken or injured portion of the handle is to be removed is placed within the clamp, as shown in Fig. 1, and a punch applied to the screw having a cross-section which will freely pass through, yet barely closely fit, the eye of the tool. The cross-bar 19 is then adjusted to bring the punch centrally over the handle, and the screw afterward operated to force the handle out through the opening 17.

Having thus described my invention, I claim as new and desire to secure by Letters Patent:

1. In a handle extractor, a clamp having jaws to bind on the tool at opposite sides, and a punch supported on the clamp, having means to force it in a direction to press the handle from the tool.

2. In a handle extractor, a clamp having jaws arranged to bind on the tool at the opposite sides, and a punch carried by the clamp and adjustable laterally crosswise thereof, having actuating means to force it in a direction to press the handle from the tool.

3. In a handle extractor, a trough clamp having sides relatively movable to and from each other and provided with screws arranged near the ends for drawing the sides together, each of said sides having a clamping jaw approximately centrally arranged, with the bottom of the clamp having an opening between said jaws, through which the handle of the tool is adapted to pass, yoke supports rigid with each of the jaws of the clamp, a cross-bar carried on the yoke supports, an actuating screw threaded through the cross-bar, and a punch arranged on the inner end of the screw in alinement with said opening.

In testimony whereof I have signed my name to this specification in the presence of two subscribing witnesses.

JAMES VENO.

Witnesses:
A. E. GALPIN,
GEO. N. WEST.